United States Patent
Aflaki Beni

(10) Patent No.: US 11,128,890 B2
(45) Date of Patent: Sep. 21, 2021

(54) METHOD FOR TEMPORAL INTER-VIEW PREDICTION AND TECHNICAL EQUIPMENT FOR THE SAME

(71) Applicant: NOKIA TECHNOLOGIES OY, Espoo (FI)

(72) Inventor: Payman Aflaki Beni, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 126 days.

(21) Appl. No.: 16/316,515

(22) PCT Filed: Jul. 13, 2017

(86) PCT No.: PCT/FI2017/050538
§ 371 (c)(1),
(2) Date: Jan. 9, 2019

(87) PCT Pub. No.: WO2018/011473
PCT Pub. Date: Jan. 18, 2018

(65) Prior Publication Data
US 2019/0313120 A1   Oct. 10, 2019

(30) Foreign Application Priority Data
Jul. 14, 2016   (GB) ..................... 1612204

(51) Int. Cl.
| | |
|---|---|
| *H04N 19/597* | (2014.01) |
| *H04N 13/204* | (2018.01) |
| *H04N 19/124* | (2014.01) |
| *H04N 19/159* | (2014.01) |
| *H04N 19/543* | (2014.01) |

(Continued)

(52) U.S. Cl.
CPC ......... *H04N 19/597* (2014.11); *H04N 5/2258* (2013.01); *H04N 5/23238* (2013.01);
(Continued)

(58) Field of Classification Search
USPC ...................................... 375/240.12
See application file for complete search history.

(56) References Cited

U.S. PATENT DOCUMENTS

| | | |
|---|---|---|
| 7,822,279 B2 | 10/2010 | Ha et al. |
| 9,042,439 B2 | 5/2015 | Lee et al. |

(Continued)

FOREIGN PATENT DOCUMENTS

WO   WO 2013/032512 A1   3/2013

OTHER PUBLICATIONS

International Search Report and Written Opinion for Application No. PCT/FI2017/050538 dated Nov. 13, 2017, 18 pages.

(Continued)

*Primary Examiner* — Jeffery A Williams
(74) *Attorney, Agent, or Firm* — Alston & Bird LLP

(57) ABSTRACT

The invention relates to a method and apparatus for implementing the method. The method comprises determining movement of a multicamera device between a first time and a second time, the multicamera comprising at least a first camera and a second camera; selecting a frame from the first camera at the first time; and entering the selected frame to a reference frame list of a frame from the second camera at the second time; where position and direction of the first camera at the first time is the same as position and direction of the second camera at the second time, and wherein the first camera and the second camera are different.

18 Claims, 12 Drawing Sheets

(51) Int. Cl.
  *H04N 5/247*      (2006.01)
  *H04N 13/243*     (2018.01)
  *H04N 19/58*      (2014.01)
  *H04N 5/225*      (2006.01)
  *H04N 13/344*     (2018.01)
  *H04N 5/232*      (2006.01)

(52) U.S. Cl.
  CPC ........... *H04N 5/247* (2013.01); *H04N 13/243* (2018.05); *H04N 13/344* (2018.05); *H04N 19/124* (2014.11); *H04N 19/159* (2014.11); *H04N 19/543* (2014.11); *H04N 19/58* (2014.11)

(56) References Cited

U.S. PATENT DOCUMENTS

| | | |
|---|---|---|
| 2004/0201756 A1 | 10/2004 | VanBree |
| 2010/0316282 A1 | 12/2010 | Hope |
| 2013/0162835 A1 | 6/2013 | Forland et al. |
| 2014/0003523 A1 | 1/2014 | Soroushian et al. |
| 2014/0218473 A1* | 8/2014 | Hannuksela ......... H04N 19/176 348/43 |
| 2014/0293016 A1 | 10/2014 | Benhimane et al. |
| 2015/0003529 A1* | 1/2015 | Thirumalai ............ H04N 19/70 375/240.14 |

OTHER PUBLICATIONS

Extended European Search Report for Application No. EP 17 82 7059 dated Feb. 4, 2020, 7 pages.

Konieczny, J. et al., *Depth-Based Inter-View Prediction of Motion vectors for Improved Multiview Video Coding*, IEEE (Jun. 7, 2010) 4 pages.

Chung, T-Y. et al., *Multi-View Video Coding With View Interpolation Prediction for 2D Camera Arrays*, J. Vis. Commun. Image R. 21 (2010) 474-486.

McVeigh, J. S. et al., *Adaptive Reference Frame Selection for Generalized Video Signal Coding*, [online] [retrieved May 2, 2019]. Retrieved from the Internet: <URL: https://www.ri.cmu.edu/pub_files/pub1/mcveigh_j_S_1996_4/mcveigh_j_s_1996_4.pdf>, (1996) 9 pages.

Yang, P. et al., *Diagonal Interview Prediction for Multiview Video Coding*, Picture Coding Symposium 2007 (Nov. 2007) 4 pages.

Zhang, G. Y. et al., *Inter-View Reference Frame Selection in Multi-View Video Coding*, 2013 Data Compression Conference (2013) 534.

Zhang, Y. et al., *Efficient Multi-Reference Frame Selection Algorithm for Hierarchical B Pictures in Multiview Video Coding*, IEEE Transactions on Broadcasting, vol. 57, No. 1 (Mar. 2011) 15-23.

* cited by examiner

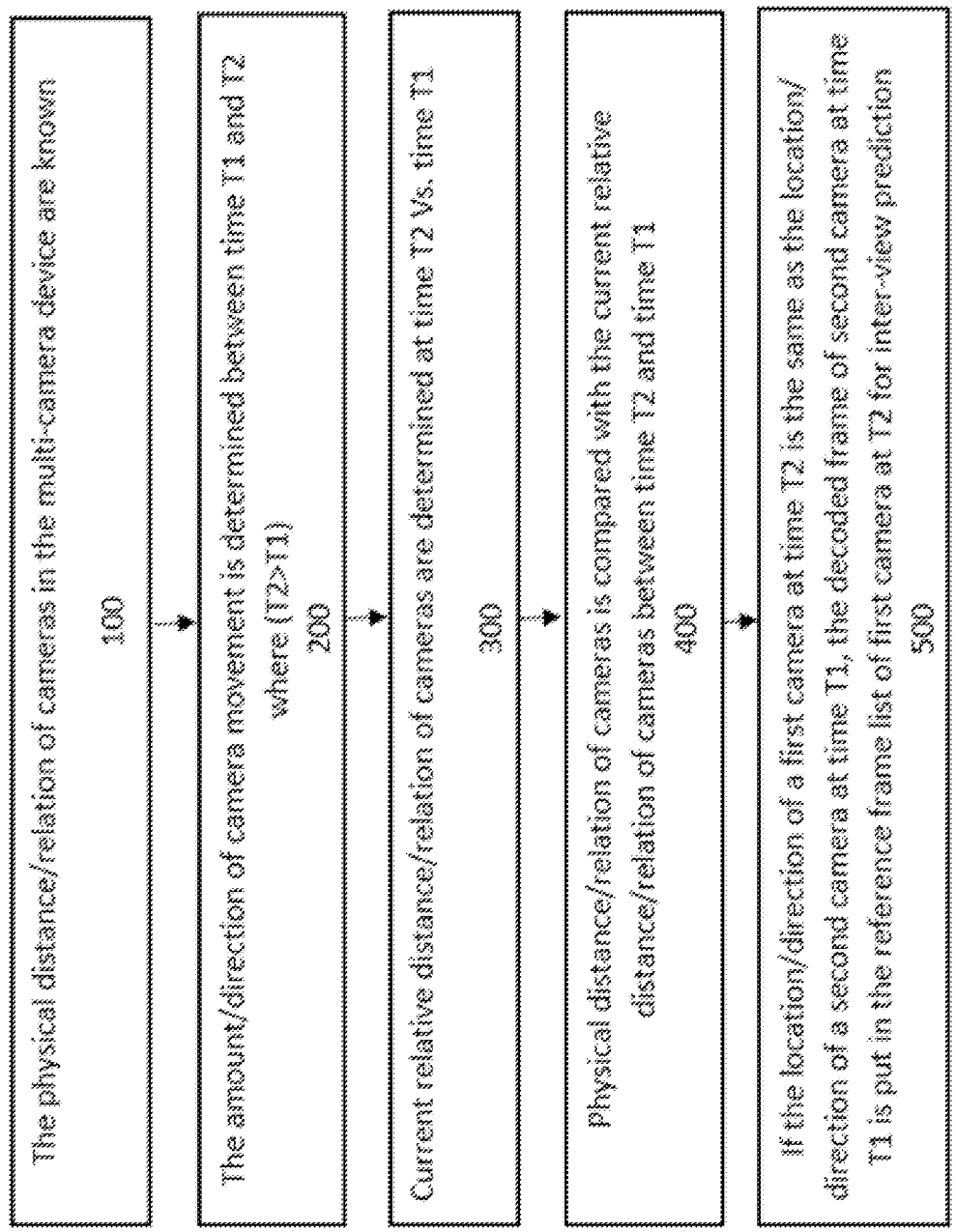

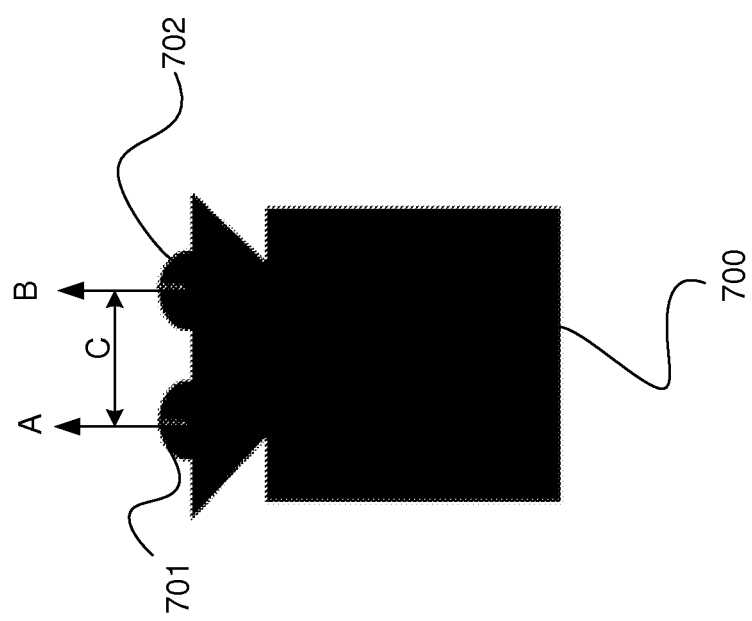

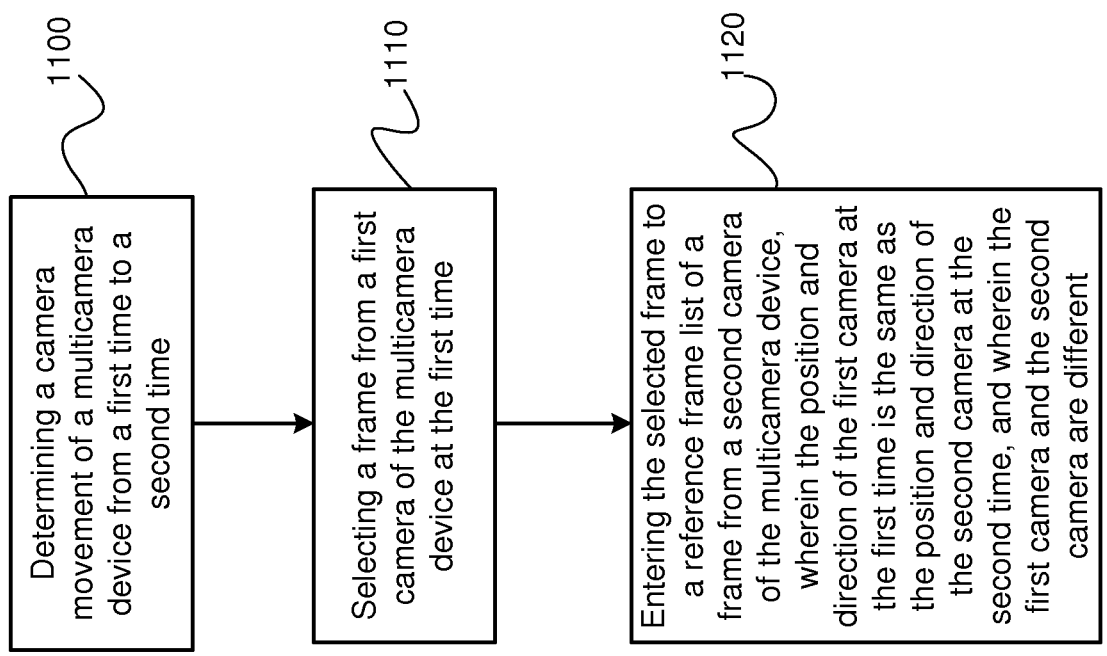

METHOD FOR TEMPORAL INTER-VIEW PREDICTION AND TECHNICAL EQUIPMENT FOR THE SAME

CROSS-REFERENCE TO RELATED APPLICATIONS

The present application is a national phase entry of International Application No. PCT/FI2017/050538, filed Jul. 13, 2017, which claims priority to GB Application No. 1612204.6, filed Jul. 14, 2016, all of which are incorporated herein by reference in their entirety.

TECHNICAL FIELD

The present solution generally relates to processing media content. In particular, the solution relates to a method and technical equipment for temporal interview prediction on stereoscopic and multiview video content.

BACKGROUND

Media content that is to be transmitted between devices, or broadcasted to several devices comprises ever-growing amount of data, since the resolution of the media content is increasing, as well as the number of views and higher frames per second (FPS). Current broadcasting infrastructure is not able to transmit this entire amount of data in real time. Therefore, it is required to decrease the amount of the required bitrate in order to enable broadcasting of such data.

SUMMARY

Now there has been invented an improved method and technical equipment implementing the method, for reducing the bitrate of a content to be broadcasted. Various aspects of the invention include a method, an apparatus and a computer readable medium comprising a computer program stored therein, which are characterized by what is stated in the independent claims. Various embodiments of the invention are disclosed in the dependent claims.

According to a first aspect, there is provided a method comprising determining movement of a multicamera device between a first time and a second time, the multicamera comprising at least a first camera and a second camera; selecting a frame from the first camera at the first time; and entering the selected frame to a reference frame list of a frame from the second camera at the second time; where position and direction of the first camera at the first time is the same as position and direction of the second camera at the second time, and wherein the first camera and the second camera are different.

According to an embodiment the method further comprises determining the position and direction of a camera based on an accelerometer or a gyroscope of the camera.

According to an embodiment the multicamera is a stereo camera.

According to an embodiment the method further comprises determining a current relative distance and relation of the first and second cameras at the second time with respect to the first time According to an embodiment the method further comprises comparing physical distance and relation of the first and the second cameras with the current relative distance and relation of the first and second cameras between the second time and the first time.

According to an embodiment, the order and location of the reference frame from the first camera in the reference frame list of the frame from the second camera depends on at least one of the following: the amount of movement in the scene between the second time and the first time; the time difference between the second time and the first time.

According to a second aspect, there is provided an apparatus comprising at least one processor, memory including computer program code, the memory and the computer program code configured to, with the at least one processor, cause the apparatus to perform at least the following: determine movement of a multicamera device between a first time and a second time, the multicamera comprising at least a first camera and a second camera; select a frame from the first camera at the first time; and enter the selected frame to a reference frame list of a frame from the second camera at the second time; where position and direction of the first camera at the first time is the same as position and direction of the second camera at the second time, and wherein the first camera and the second camera are different.

According to an embodiment the apparatus further comprises computer program code configured to cause the apparatus to determine the position and direction of a camera based on an accelerometer or a gyroscope of the camera.

According to an embodiment the multicamera is a stereo camera.

According to an embodiment the apparatus further comprises computer program code configured to cause the apparatus to determine a current relative distance and relation of the first and second cameras at the second time with respect to the first time According to an embodiment the apparatus further comprises computer program code configured to cause the apparatus to compare physical distance and relation of the first and the second cameras with the current relative distance and relation of the first and second cameras between the second time and the first time.

According to an embodiment, the order and location of the reference frame from the first camera in the reference frame list of the frame from the second camera depends on at least one of the following: the amount of movement in the scene between the second time and the first time; the time difference between the second time and the first time.

According to a third aspect, there is provided an apparatus comprising: means for determining movement of a multicamera device between a first time and a second time, the multicamera comprising at least a first camera and a second camera; means for selecting a frame from the first camera at the first time; and means for entering the selected frame to a reference frame list of a frame from the second camera at the second time; where position and direction of the first camera at the first time is the same as position and direction of the second camera at the second time, and wherein the first camera and the second camera are different.

According to an embodiment the apparatus further comprises means for determining the position and direction of a camera based on an accelerometer or a gyroscope of the camera.

According to an embodiment the multicamera is a stereo camera.

According to an embodiment the apparatus further comprises means for determining a current relative distance and relation of the first and second cameras at the second time with respect to the first time According to an embodiment the apparatus further comprises means for comparing physical distance and relation of the first and the second cameras with the current relative distance and relation of the first and second cameras between the second time and the first time.

According to an embodiment, the order and location of the reference frame from the first camera in the reference frame list of the frame from the second camera depends on at least one of the following: the amount of movement in the scene between the second time and the first time; the time difference between the second time and the first time.

According to a fourth aspect, there is provided computer program product embodied on a non-transitory computer readable medium, comprising computer program code configured to, when executed on at least one processor, cause an apparatus or a system to: determine movement of a multicamera device between a first time and a second time, the multicamera comprising at least a first camera and a second camera; select a frame from the first camera at the first time; and enter the selected frame to a reference frame list of a frame from the second camera at the second time; where position and direction of the first camera at the first time is the same as position and direction of the second camera at the second time, and wherein the first camera and the second camera are different.

DESCRIPTION OF THE DRAWINGS

In the following, various embodiments of the invention will be described in more detail with reference to the appended drawings, in which

FIG. 6 is a flowchart illustrating a method according to an embodiment;

FIG. 7 shows a camera device according to an embodiment;

FIG. 11 shows a method according to an embodiment as a flowchart; and

DESCRIPTION OF EXAMPLE EMBODIMENTS

The present embodiments are discussed in relation to a content captured with a multicamera device. A multicamera device comprises two or more cameras, wherein the two or more cameras may be arranged in pairs in said multicamera device. Each said camera has a respective field of view, and each said field of view covers the view direction of the multicamera device.

The multicamera device may comprise cameras at locations corresponding to at least some of the eye positions of a human head at normal anatomical posture, eye positions of the human head at maximum flexion anatomical posture, eye positions of the human head at maximum extension anatomical postures, and/or eye positions of the human head at maximum left and right rotation anatomical postures. The multicamera device may comprise at least three cameras, the cameras being disposed such that their optical axes in the direction of the respective camera's field of view fall within a hemispheric field of view, the multicamera device comprising no cameras having their optical axes outside the hemispheric field of view, and the multicamera device having a total field of view covering a full sphere.

The multicamera device described here may have cameras with wide-angle lenses. The multicamera device may be suitable for creating stereo viewing image data and/or multiview video, comprising a plurality of video sequences for the plurality of cameras. The multicamera may be such that any pair of cameras of the at least two cameras has a parallax corresponding to parallax (disparity) of human eyes for creating a stereo image. At least two cameras may have overlapping fields of view such that an overlap region for which every part is captured by said at least two cameras is defined, and such overlap area can be used in forming the image for stereo viewing.

Figure 1:
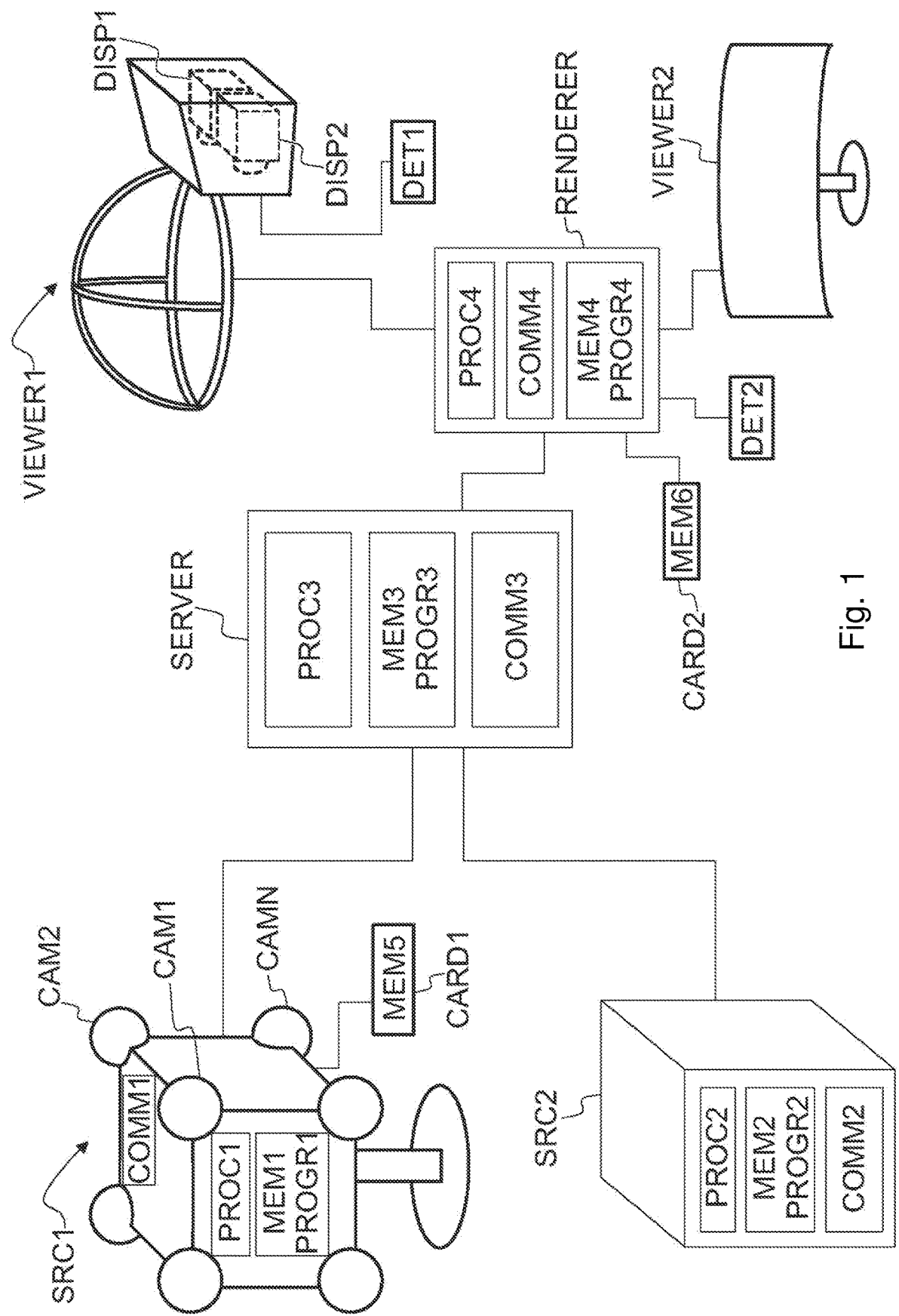
FIG. 1 shows a system and apparatuses for stereo viewing.

FIG. 1 shows a system and apparatuses for stereo viewing, that is, for 3D video and 3D audio digital capture and playback. The task of the system is that of capturing sufficient visual and auditory information from a specific location such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image sources, a server and a rendering device. A video capture device SRC1 comprises multiple cameras CAM1, CAM2, . . . , CAMN with overlapping field of view so that regions of the view around the video capture device is captured from at least two cameras. The device SRC1 may comprise multiple microphones to capture the timing and phase differences of audio originating from different directions. The device SRC1 may comprise a high resolution orientation sensor so that the orientation (direction of view) of the plurality of cameras can be detected and recorded. The device SRC1 comprises or is functionally connected to a computer processor PROC1 and memory MEM1, the memory comprising computer program PROGR1 code for controlling the video capture device. The image stream captured by the video capture device may be stored on a memory device MEM2 for use in another device, e.g. a viewer, and/or transmitted to a server using a communication interface COMM1. It needs to be understood that although an 8-camera-cubical setup is described here as part of the system, another multicamera (e.g. a stereo camera) device may be used instead as part of the system.

Alternatively or in addition to the video capture device SRC1 creating an image stream, or a plurality of such, one or more sources SRC2 of synthetic images may be present in the system. Such sources of synthetic images may use a computer model of a virtual world to compute the various image streams it transmits. For example, the source SRC2 may compute N video streams corresponding to N virtual cameras located at a virtual viewing position. When such a synthetic set of video streams is used for viewing, the viewer may see a three-dimensional virtual world. The device SRC2 comprises or is functionally connected to a computer processor PROC2 and memory MEM2, the memory comprising computer program PROGR2 code for controlling the synthetic sources device SRC2. The image stream captured by the device may be stored on a memory device MEM5 (e.g. memory card CARD1) for use in another device, e.g. a viewer, or transmitted to a server or the viewer using a communication interface COMM2.

There may be a storage, processing and data stream serving network in addition to the capture device SRC1. For example, there may be a server SERVER or a plurality of servers storing the output from the capture device SRC1 or computation device SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROG4 code for controlling the viewing devices. The viewer (playback) devices may consist of a data stream receiver for receiving a video data stream from a server and for decoding the video data stream. The data stream may be received over a network connection through communications interface COMM4, or from a memory device MEM6 like a memory card CARD2. The viewer devices may have a graphics processing unit for processing of the data to a suitable format for viewing. The viewer VIEWER1 comprises a high-resolution stereo-image head-mounted display for viewing the rendered stereo video sequence. The head-mounted display may have an orientation sensor DET1 and stereo audio headphones. The viewer VIEWER2 comprises a display enable with 3D technology (for displaying stereo video), and the rendering device may have a head-orientation detector DET2 connected to it. Any of the devices (SRC1, SRC2, SERVER, RENDERER, VIEWER1, VIEWER2) may be a computer or a portable computing device, or be connected to such. Such rendering devices may have computer program code for carrying out methods according to various examples described in this text.

Figure 2A:
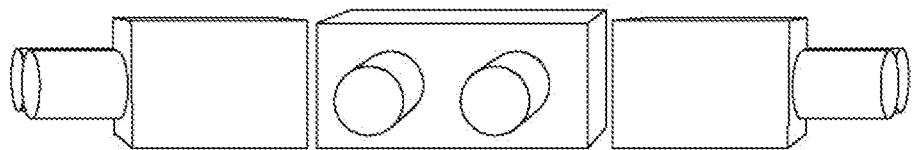
FIG. 2a shows a camera device for stereo viewing.

FIG. 2a shows a camera device for stereo viewing. The camera comprises two or more cameras that are configured into camera pairs for creating the left and right eye images, or that can be arranged to such pairs. The distances between cameras may correspond to the usual (or average) distance between the human eyes. The cameras may be arranged so that they have significant overlap in their field-of-view. For example, wide-angel lenses of 180-degrees or more may be used, and there may be 2, 3, 4, 5, 6, 7, 8, 9, 10, 12, 16, or 20 cameras. The cameras may be regularly or irregularly spaced to access the whole sphere of view, or they may cover only part of the whole sphere. For example, there may be three cameras arranged in a triangle and having different directions of view towards one side of the triangle such that all three cameras cover an overlap area in the middle of the directions of view. As another example, 8 cameras having wide-angle lenses and arranged regularly at the corners of a virtual cube and covering the whole sphere such that the whole or essentially whole sphere is covered at all directions by at least 3 or 4 cameras. In FIG. 2a three stereo camera pairs are shown.

Multicamera devices with other types of camera layouts may be used. For example, a camera device with all cameras in one hemisphere may be used. The number of cameras may be e.g., 2, 3, 4, 6, 8, 12, or more. The cameras may be placed to create a central field of view where stereo images can be formed from image data of two or more cameras, and a peripheral (extreme) field of view where one camera covers the scene and only a normal non-stereo image can be formed.

Figure 2B:
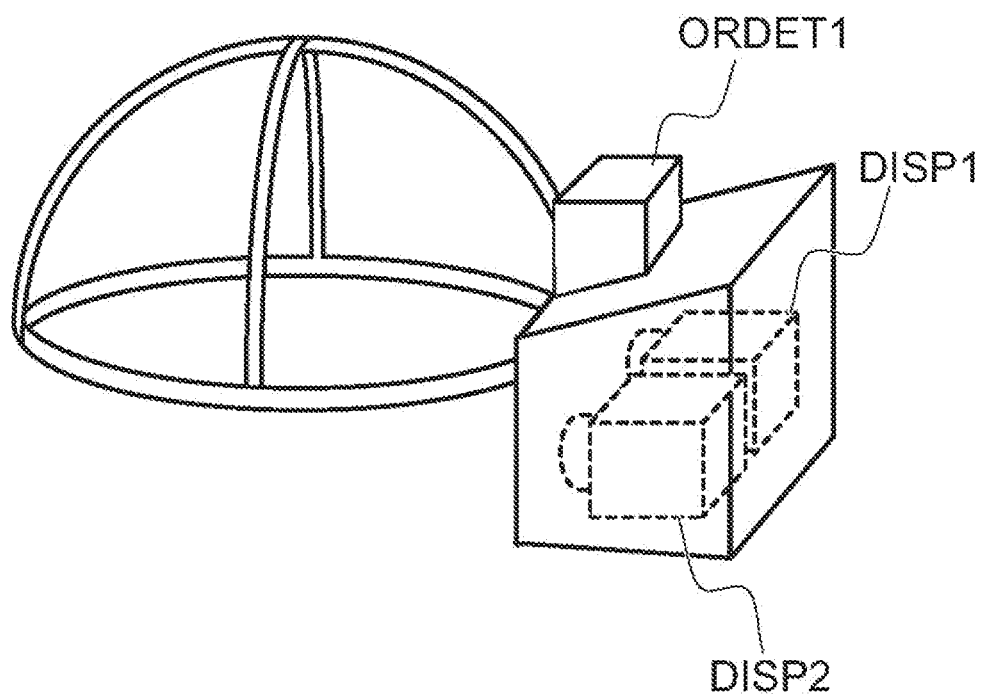
FIG. 2b shows a head-mounted display for stereo viewing.

FIG. 2b shows a head-mounted display for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

Figure 3:
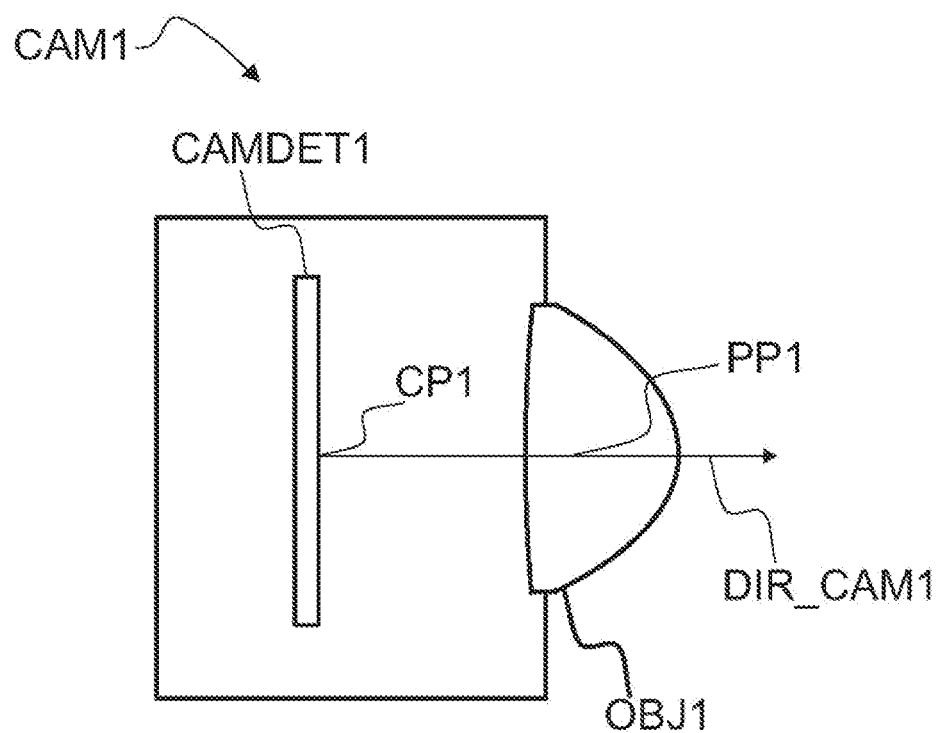
FIG. 3 shows a camera according to an embodiment.

FIG. 3 illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal center point CP1 that is a middle point of the plurality of sensor elements, for example for a rectangular sensor the crossing point of the diagonals. The lens has a nominal center point PP1, as well, lying for example on the axis of symmetry of the lens. The direction of orientation of the camera is defined by the line passing through the center point CP1 of the camera sensor and the center point PP1 of the lens. The direction of the camera is a vector along this line pointing in the direction from the camera sensor to the lens. The optical axis of the camera is understood to be this line CP1-PP1.

The system described above may function as follows. Time-synchronized video, audio and orientation data is first recorded with the capture device. This can consists of multiple concurrent video and audio streams as described above. These are then transmitted immediately or later to the storage and processing network for processing and conversion into a format suitable for subsequent delivery to playback devices. The conversion can involve post-processing steps to the audio and video data in order to improve the quality and/or reduce the quantity of the data while preserving the quality at a desired level. Finally, each playback device receives a stream of the data from the network, and renders it into a stereo viewing reproduction of the original location which can be experienced by a user with the head-mounted display and headphones.

Figure 4A:
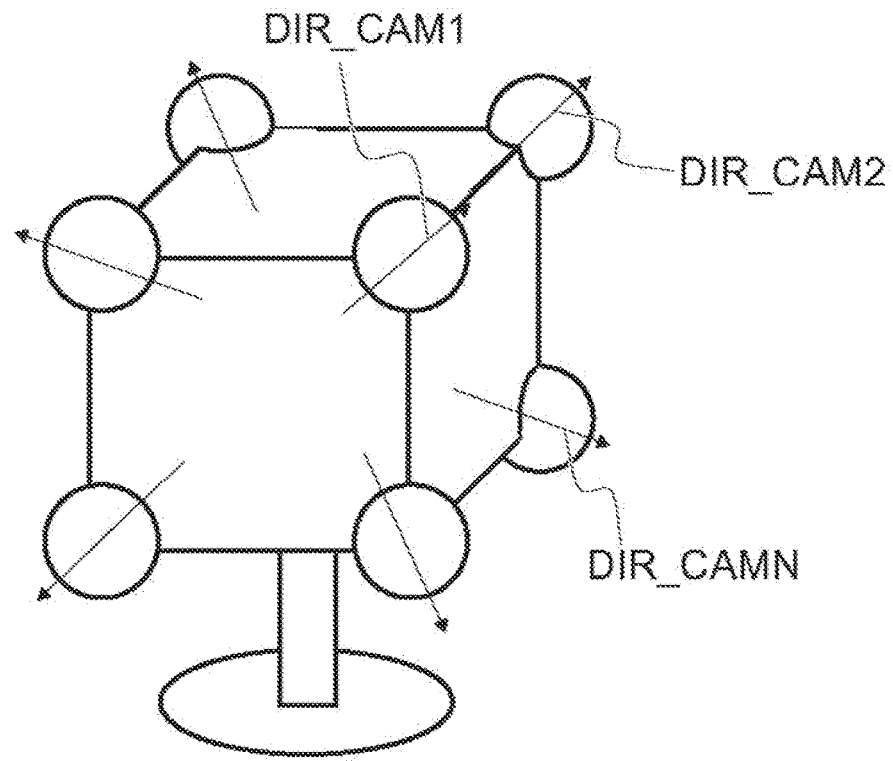
FIGS. 4a, b show examples of a multicamera device.
Figure 4B:
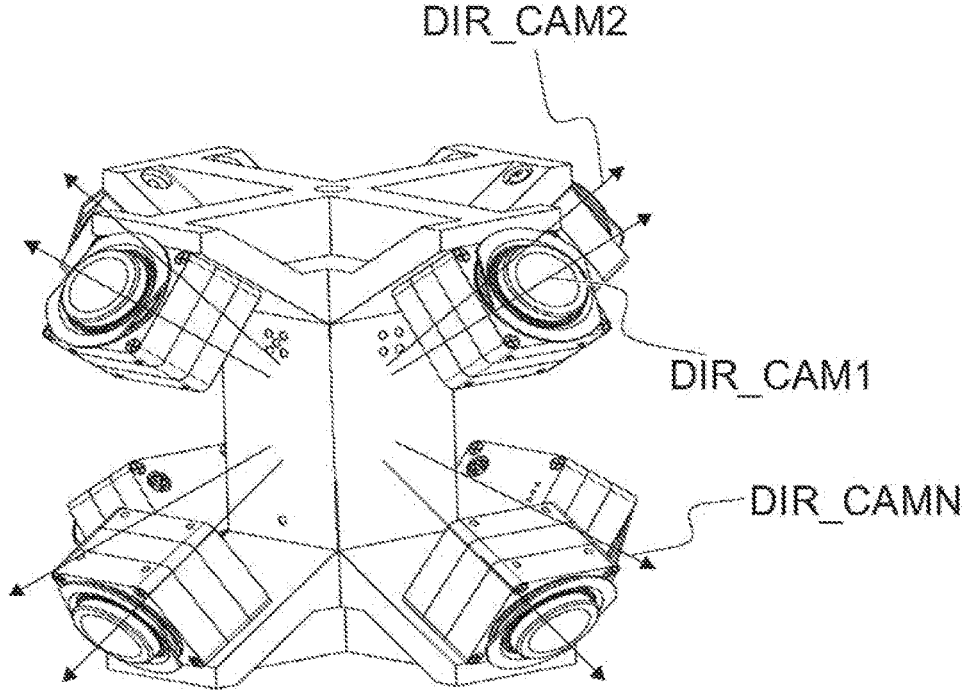

FIGS. 4a and 4b show an example of a camera device for being used as an image source. To create a full 360 degree stereo panorama every direction of view needs to be photographed from two locations, one for the left eye and one for the right eye. In case of video panorama, these images need to be shot simultaneously to keep the eyes in sync with each other. As one camera cannot physically cover the whole 360 degree view, at least without being obscured by another camera, there need to be multiple cameras to form the whole 360 degree panorama. Additional cameras however increase the cost and size of the system and add more data streams to be processed. This problem becomes even more significant when mounting cameras on a sphere or platonic solid shaped arrangement to get more vertical field of view. However, even by arranging multiple camera pairs on for example a sphere or platonic solid such as octahedron or dodecahedron, the camera pairs will not achieve free angle parallax between the eye views. The parallax between eyes is fixed to the positions of the individual cameras in a pair, that is, in the perpendicular direction to the camera pair, no parallax can be achieved. This is problematic when the stereo content is viewed with a head mounted display that allows free rotation of the viewing angle around z-axis as well.

The requirement for multiple cameras covering every point around the capture device twice would require a very large number of cameras in the capture device. In this technique lenses are used with a field of view of 180 degree (hemisphere) or greater, and the cameras are arranged with a carefully selected arrangement around the capture device. Such an arrangement is shown in FIG. 4a, where the cameras have been positioned at the corners of a virtual cube, having orientations DIR_CAM1, DIR_CAM2, . . . , DIR_CAMN pointing away from the center point of the cube. Naturally, other shapes, e.g. the shape of a cuboctahedron, or other arrangement, even irregular ones, can be used.

Overlapping super wide field of view lenses may be used so that a camera can serve both as the left eye view of a camera pair and as the right eye view of another camera pair. This reduces the amount of needed cameras to half. As a surprising advantage, reducing the number of cameras in this manner increases the stereo viewing quality, because it also allows to pick the left eye and right eye cameras arbitrarily among all the cameras as long as they have enough overlapping view with each other. Using this technique with different number of cameras and different camera arrangements such as sphere and platonic solids enables picking the closest matching camera for each eye achieving also vertical parallax between the eyes. This is beneficial especially when the content is viewed using head mounted display. The described camera setup may allow creating stereo viewing with higher fidelity and smaller expenses of the camera device.

The present embodiments relate to multicamera system comprising at least two cameras. In particular, the present embodiments relate to stereoscopic and multiview video compression. The present embodiments propose a new method for selecting reference frames from a first view and entering the selected frames into a reference frame list (RFL) of a second view. The selection depends on the physical distance between two cameras and movement of a first camera from one location at a first time (T1) to another location at a second time (T2). If the amount and direction of movement is the same as the amount and direction of distance between the two cameras, then the frame taken from the first view (i.e. view from the first camera) at the first time will be added to the RFL for the frame to be encoded for the second view (i.e. view from the second camera) at the second time, where the first view and the second view have the same location and direction at first and second times, respectively.

In the related technology, a technique called depth map is known. Depth map presents values related to the distance of the surface of the scene objects from the view point of an observer. Since depth maps are generated containing a depth value from each pixel in the image, they can be depicted as gray-level images. Depth maps can be considered approximately piecewise planar, with highly homogeneous regions separated by strong contours. As a result, one can conclude that by preserving more contours, the possibility of exploiting depth map for virtual view synthesis issues will increase. This can be confirmed while observing the abundant ongoing research on the segmentation based compression methods applied to depth maps or different edge aware depth map resampling algorithms.

Multiview video plus depth (MVD) refers to a set of texture views accompanied with per-pixel depth map components. The reason to include depth maps is to exploit them in different (de)coding and post-processing steps e.g. increase the efficiency of texture view compression or use them in view synthesis. The higher is the quality of depth map, the better is the quality of virtual rendered views and the less there are synthesis artefacts presented in the rendered views. However, in some cases, if the depth map quality is very low, the synthesis artefacts in rendered view may dominate the subjective quality and hence the rendered view cannot be considered to be viewed to the end user.

The views of a multiview video sequence represent different projections of the same real world scene, which are synchronously captured with multiple cameras which are slightly located separately from each other. The content of one view can be used as the base for the other view meaning that when one view is available in the decoder side, this view can be used in the inter-view prediction process to code the other view(s) more efficiently. Such inter-view prediction decreases the bitrate required to encode the other view(s) (other than the base view) compared to the base view. One contributor to the amount of difference between the objects/scene content in two views is how far those objects are from the camera. The closer the objects are, the more there is difference in placement of those objects in different views.

Inter-view prediction is used to take into account the available redundancies between two views which have been captured from the same scene at the same time with different cameras. This is attributed to the fact that the views are captured at the same time from a slightly different viewing direction, and hence, they are representing the same content with a disparity introduced to different parts of the scene depending on their distance from the capturing device.

Temporal prediction takes into account the similarities between the same scenes captured with a specific camera at two different time stamps. This means there are similarities between the content captured by a camera at two different times and the later frame can be estimated based on the content of the first frame. The more there are static parts in the scene, the more there are similarities between the two frames.

Figure 5A:
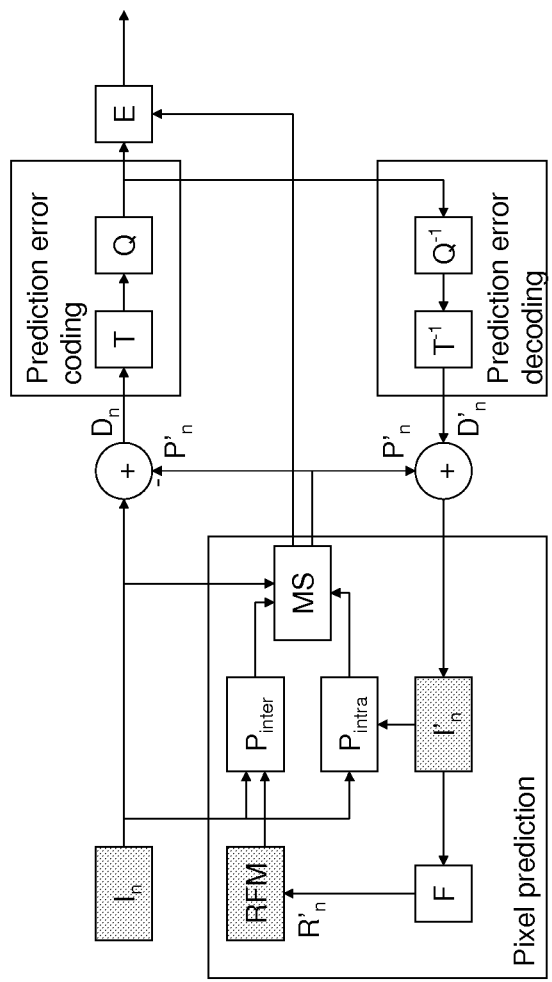
FIGS. 5a, b show an encoder and a decoder according to an embodiment.
Figure 5B:
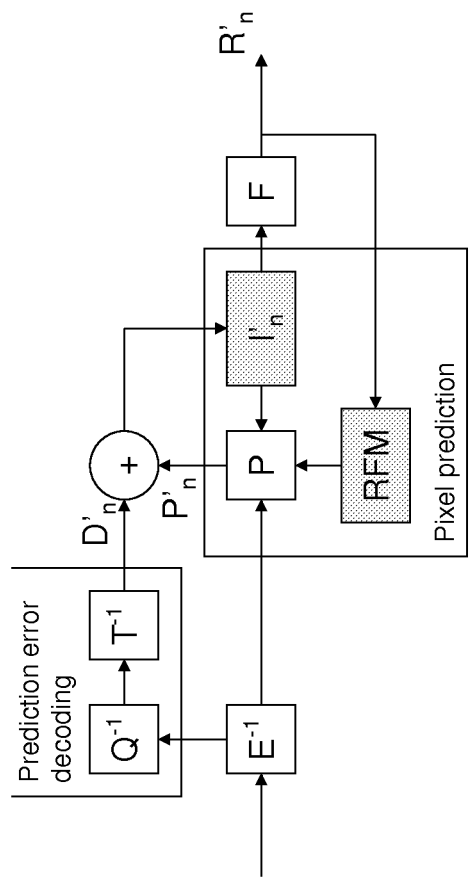

A video codec consists of an encoder that transforms an input video into a compressed representation suited for storage/transmission and a decoder that can uncompress the compressed video representation back into a viewable form. Typically encoder discards some information in the original video sequence in order to represent the video in a more compact form (that is, at lower bitrate). An example of an encoding process is illustrated in FIG. 5a. FIG. 5a illustrates an image to be encoded ($I_n$); a predicted representation of an image block ($P'_n$); a prediction error signal ($D_n$); a reconstructed prediction error signal ($D'_n$); a preliminary reconstructed image ($I'_n$); a final reconstructed image ($R'_n$); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$), mode selection (MS) and filtering (F). An example of a decoding process is illustrated in FIG. 5b. FIG. 5b illustrates a predicted representation of an image block ($P'_n$); a reconstructed prediction error signal ($D'_n$); a preliminary reconstructed image ($I'_n$); a final reconstructed image ($R'_n$); an inverse transform ($T^{-1}$); an inverse quantization ($Q^{-1}$); an entropy decoding ($E^{-1}$); a reference frame memory (RFM); a prediction (either inter or intra) (P); and filtering (F).

Many media-capable devices may be equipped with different types of motion/pressure sensors (e.g. gyroscope, accelerometer, barometer, etc.) which can be used to interpret the location-difference of a device relative to a previous reference location in time. Solutions such as Inertial Navigation Systems (INS) are built using this approach and used for location tracking (e.g. indoors). Such devices are getting more accurate every day. Handheld devices, equipped with video capturing features, can calculate the differential location information depending on the initial velocity and motion sensor data (e.g. accelerometer sensor) provided by the recording device.

As was stated, the current broadcasting infrastructure is not able to transmit in real time the huge amount of data of a content having high resolution. Therefore, it is required to decrease the amount of the required bitrate in order to enable broadcasting of such data. The present embodiments enable efficient and intelligent temporal inter-view prediction on stereoscopic and multiview video content.

The present embodiments are targeted to find a reference frame of one view for another view considering the structure and movement of the multicamera device. The present embodiments take into account the relative location of cameras at different times along with the structure of the cameras to select the potential reference frame that will be added to the reference frame list. Thus, the present embodiments are only enabled when the camera movement is involved.

A method according to an embodiment is shown in FIG. 6. The method begins from physical distance and relative direction of cameras in the multicamera device 100 which are known, and determining 200 the amount and relative direction of camera movement between a first time T1 and a second time T2, where T2>T1. The current relative movement distance and relative direction of first and second cameras are determined 300 at the second time T2 versus the first time T1. When the current relative movement distance and relative direction have been determined, physical distance and relative direction of first and second cameras are compared 400 with the determined current relative movement distance and relative direction of first and second cameras between the second time T2 and the first time T1. If the location and direction of a second camera at the second time T2 is the same as the location and direction of a first camera at the first time T1, the decoded frame of first camera at the first time T1 is entered 500 to a reference frame list of the second camera at the second time T2 for temporal inter-view prediction.

In the following, steps 100-500 are discussed in more detailed manner.

In step 100, the physical data concerning cameras is known from the characteristics of the multicamera device. This data will include the relative camera distance and angle separation among all possible selections of two cameras in the multicamera device. For example, if a multicamera device has four cameras C1, C2, C3, C4, there are six possible values as the relative distance and angle between any two arbitrary cameras: {C1C2, C1C3, C1C4, C2C3, C2C4, C3C4}. All these values for relative distance and angle are taken into account in the following steps to find reference frames for the current frame to be encoded. It is understood that the relative distance and angle between any first and second cameras are not necessarily the same, which means that C1C2 is not necessarily the same as C3C4. This depends on the structure of the multicamera device.

The multicamera device may include only two cameras as in a stereo camera, or it may include a plurality of cameras, e.g. eight cameras. This is shown also in FIG. 7. FIG. 7 represents a camera device 700 having a first camera 701 and a second camera 702. Reference A represents a viewing direction of the first camera 701, and reference B represents a viewing direction of the second camera 702. Reference C indicates the relative distance between the cameras with no angular difference.

In step 200, the relative distance and relative direction of camera movement between the first time T1 and the second time T2 are calculated based on the built-in movement tracker device e.g. an accelerometer or a gyroscope in the multicamera device. The capturing device according to an embodiment is equipped with a built-in accelerometer or gyroscope or any other device that enables tracking the device movements. Such tracking devices enable the capability of tracking the movement of device from a location A at first time T1 to a location B at second time T2 (where T2 happens later than T1, i.e. T2=T1+t). Using the built-in tracking devices, the moved distance and its direction and angle (or the path in general) may be tracked and saved. This feature along with the characteristics of the multicamera device, showing exactly where the cameras are located relative to the device used for measuring the movements, enables the device to determine the precise location and direction of each and every camera at any time phase. Therefore, if needed, it is possible to search through the saved information to see and potentially compare the current location and direction of each camera to the location and direction of the same or other cameras at any time.

Figure 8:
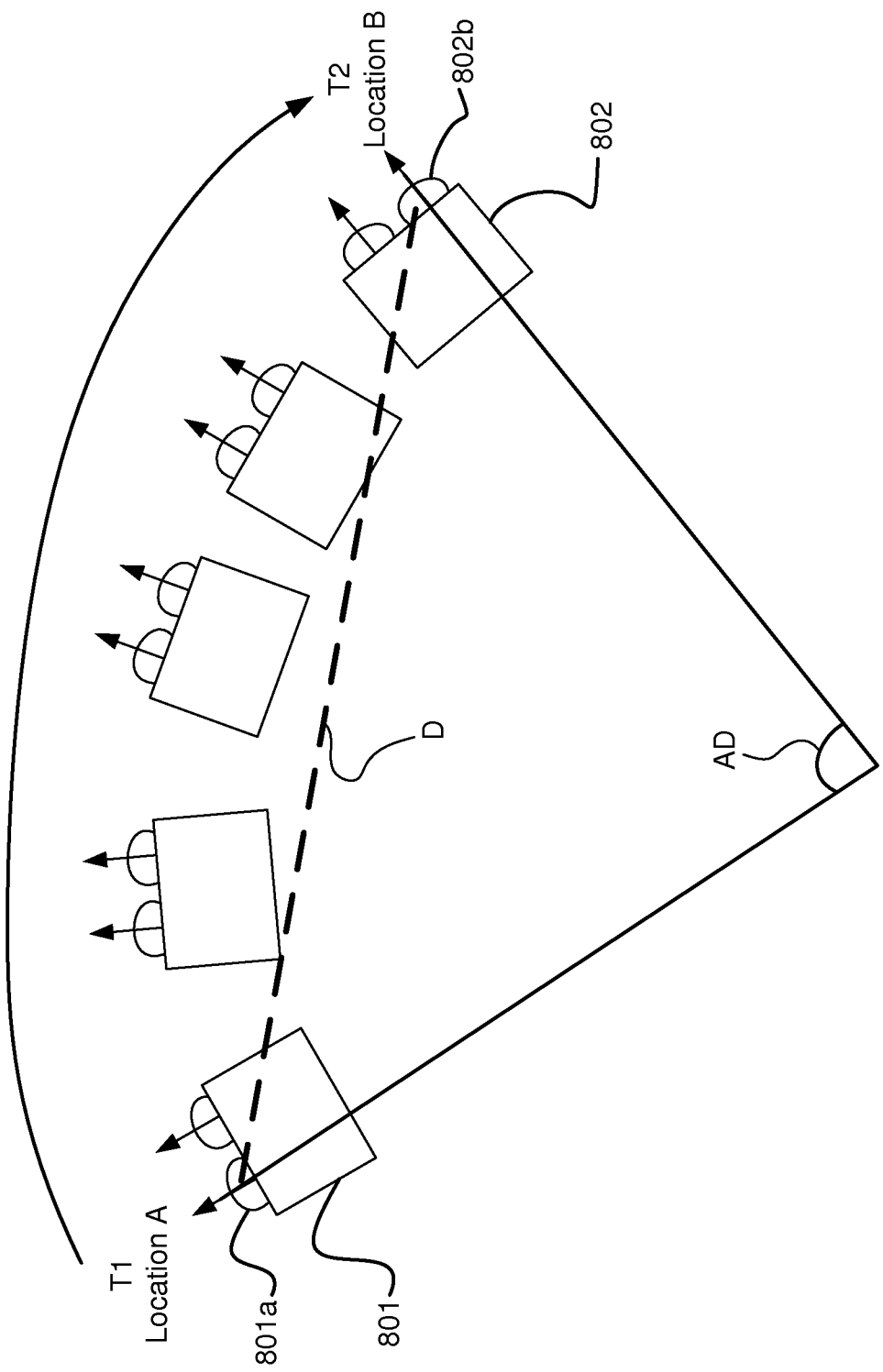
FIG. 8 shows an example of distance and angle difference between two cameras.

In step 300, the current relative distance and relative direction of cameras are determined based on step 200. According to an embodiment, the inputs for this process are time stamps T1 and T2, and the output is the relative distance and relative direction of the cameras in the second time T2 compared to location of cameras at the first time T1 taking into account the readings from the built-in accelerometer or gyroscope of the multicamera device. This is shown in FIG. 8, where the distance D and angle comparison AD between two arbitrary cameras 801a, 802b are depicted. In this embodiment, the distance D and angle difference AD between a first camera 801a of the multicamera device 801 at first time T1 and a location A is calculated against a second camera 802b of the multicamera device 802 at second time T2 and a location B. It should be noticed that any other comparison between the cameras can be achieved in the same way. It should also be noticed that there are other approaches for determining the relative orientation of the cameras, which can be used instead of this embodiment as well.

In step 400, values from steps 100 and 300 are compared. The output of step 100, i.e. a relative distance and angle between camera pairs, is compared with all possible combinations of step 300, i.e. relative movement difference. All possible combinations include the differences between camera locations at different time stamps and different locations. The camera pairs whose relative movement difference is the same as the relative difference known from step 100 are the ones that will get a new reference in their RFL. The content captured at the second time T2 (i.e. the later frame) is the one that is being encoded currently, and the frame from the first time T1 (i.e. the earlier time) which has already been encoded, is the one used as the reference.

In step 500, the reference to the decoded frame of a first camera at the first time T1 is determined and entered to a RFL of the frame of second camera at the second time T2 to be encoded.

The amount of movement (i.e. motion) in the scene is calculated based on the ratio between the static background or region and the moving objects or moving regions in the scene. The more there is static background, the lower is the motion in the scene. Similarly, the more there are moving parts, the higher is the motion in the scene. It should be noted that the scene movement may be calculated based on the movement captured from one physical point of view and not from the perspective of one camera, as there might be some objects moving with the same speed and direction as the moving camera which are actually contributing to the motion in the scene, while they look static in the content captured from the point of view of the respective camera.

Figure 9:
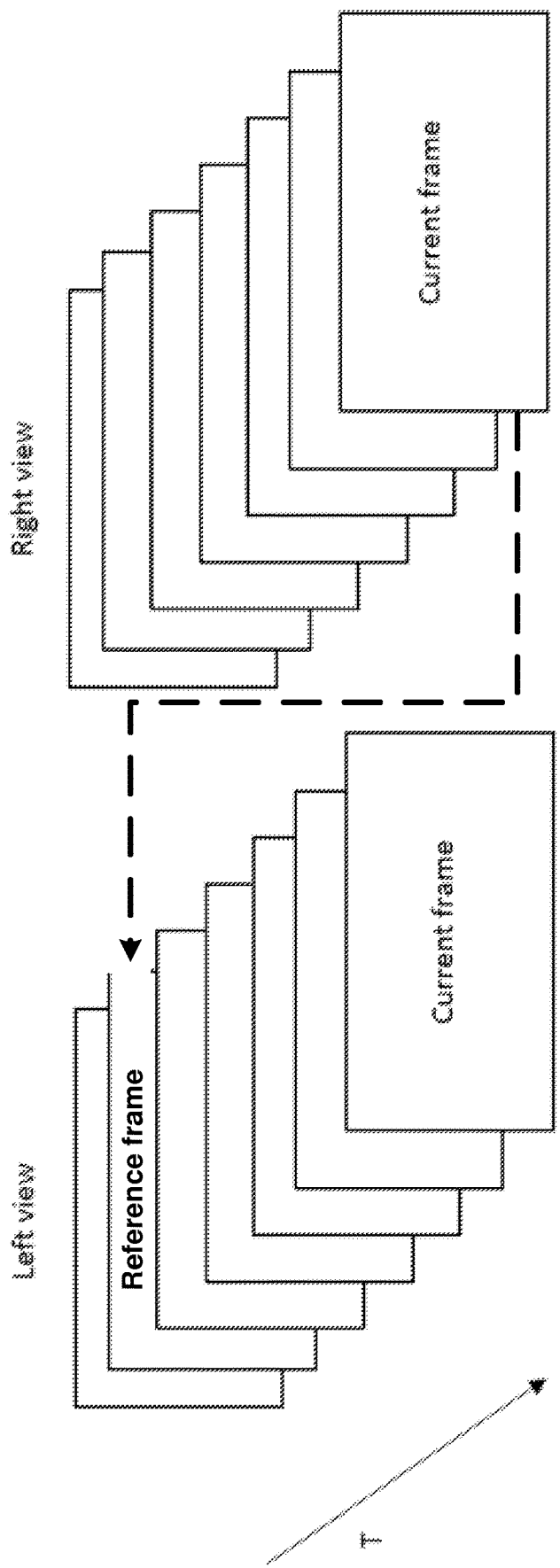
FIG. 9 shows an example of determining a reference to a decoded frame of a second camera.
Figure 10:
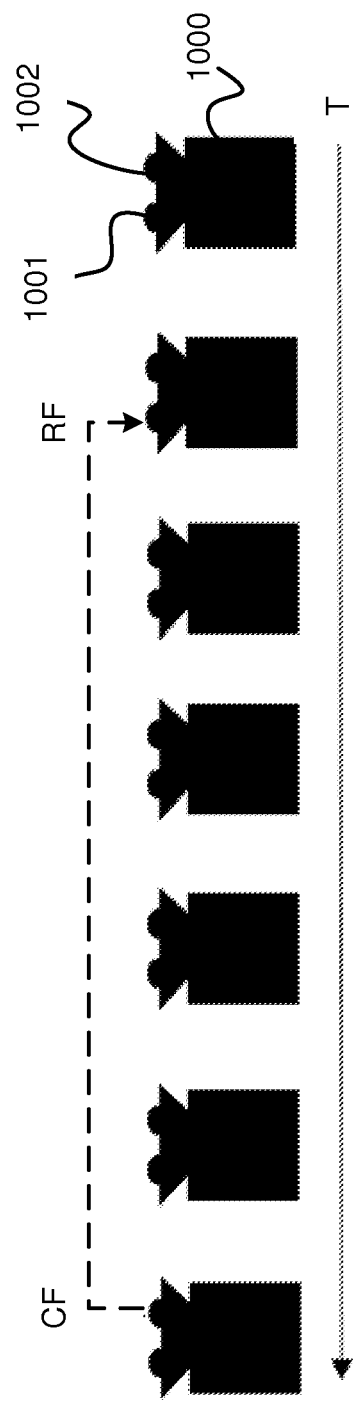
FIG. 10 shows an example of determining a reference to a decoded frame of a second camera by means of multicamera device.

The order and location in which the reference is being entered in the RFL depends on the amount of movement in the scene. The less there is movement, the better the interview prediction is, and hence, the higher is the order of this reference in the RFL of the frame to be encoded. The more there is movement, the less expected similarities there are between the content captured previously at the same location and direction, and hence, the lower is the order of this reference in the RFL of the frame to be encoded. A frame based presentation of the step 500 is depicted in FIG. 9 while a similar presentation of the step 500 based on the location of multicamera device or a stereo camera device 1000 and its cameras 1001, 1002 is depicted in FIG. 10. FIG. 10 illustrate the camera movement direction T, and a current frame CF and a reference frame FR. It is appreciated that the camera movement is exaggerated in FIG. 10 for clarifying the idea. The selection of the two cameras in FIGS. 9 and 10 is arbitrary.

In above, a method has been described by means of embodiments. It is realized that the method is enabled only when the movement of the multicamera device is tracked. The utilization of the algorithm can start as soon as the movement has been detected.

Different algorithms can be considered for entering the selected frame to the reference frame list. For example, according to an embodiment, when the current frame is being captured in a close vicinity of the previous captured location, the reference frame can be used in the RFL. This means that in this embodiment it is not necessarily required that the relative location and direction exactly match. According to another embodiment, the proposed algorithm is enabled only when the camera movement speed is faster than a specified threshold. In this embodiment, the slower is the movement speed of the camera, the larger is the temporal difference between the first time and the second time, and hence, the less is the relation between the content in two different time stamps from the same viewing point. According to yet another embodiment, the proposed algorithm is enabled only when the scene content movement speed is slower than a specified threshold. This means that the higher is the movement speed of the scene content, the lower is the relation between the content in two different time stamps from the same viewing point. According to yet a further embodiment, the proposed algorithm may be enabled only if the difference between the first time and the second time is smaller than a specified threshold.

A method according to an embodiment is illustrated by a flowchart of FIG. 11. The method comprises determining 1100 movement of a multicamera device from a first time to a second time, the multicamera comprising at least a first camera and a second camera; selecting 1110 a frame from the first camera at the first time and entering 1120 the selected frame to a reference frame list of a frame from the second camera at the second time; where position and direction of the first camera at the first time is the same as position and direction of the second camera at the second time, and wherein the first camera and the second camera are different.

In previous, a method according to an embodiment was discussed by means of various examples. An apparatus according to an embodiment comprises means for implementing the method, i.e. means for determining movement of a multicamera device from a first time to a second time, the multicamera comprising at least a first camera and a second camera; means for selecting a frame from the first camera at the first time and entering the selected frame to a reference frame list of a frame from the second camera at the second time; where position and direction of the first camera at the first time is the same as position and direction of the second camera at the second time, and wherein the first camera and the second camera are different.

Figure 12A:
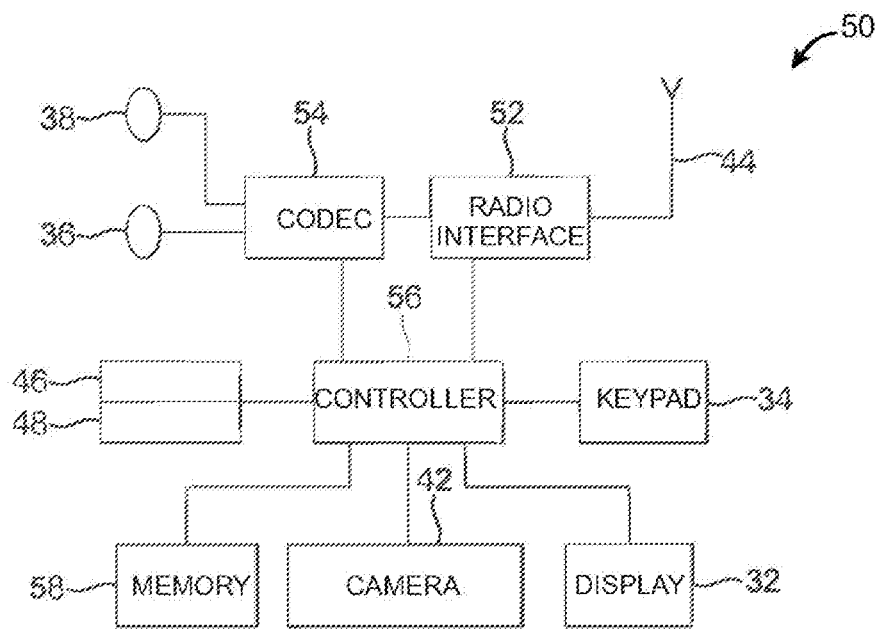
FIGS. 12a, b show an apparatus according to an embodiment.
Figure 12B:
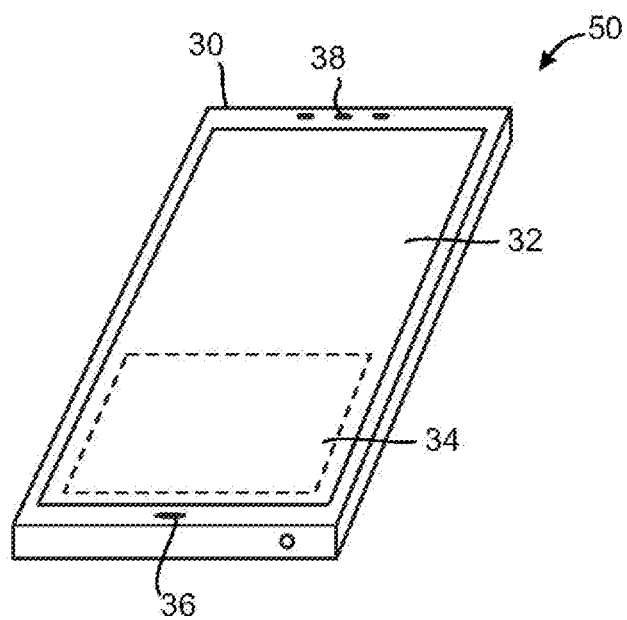

An embodiment of an apparatus is illustrated in FIGS. 12a and 12b. FIG. 12a shows a block diagram of a video coding system according to an example embodiment as a schematic block diagram of an electronic device 50, which may incorporate a codec. FIG. 12b shows a layout of an apparatus according to an embodiment. The electronic device 50 may for example be a mobile terminal or a user equipment of a wireless communication system or a camera device.

The apparatus 50 may comprise a housing 30 for incorporating and protecting the device. The apparatus 50 may further comprise a display 32 in the form of a liquid crystal display. In other embodiments of the invention the display may be any suitable display technology suitable to display an image 30 or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. The camera 42 is a multicamera having at least two cameras. The camera is capable of recording or detecting individual frames which are then passed to the codec 54 or the controller for processing. The apparatus may receive the video and/or image data for processing from another device prior to transmission and/or storage.

The apparatus 50 may further comprise an infrared port for short range line of sight communication to other devices.

According to an embodiment, the apparatus may further comprise any suitable short range communication solution such as for example a Bluetooth wireless connection or a USB (Universal Serial Bus)/firewire wired connection.

The apparatus 50 may comprise a controller 56 or processor for controlling the apparatus 50. The controller 56 may be connected to memory 58 which may store data in the form of image, video and/or audio data, and/or may also store instructions for implementation on the controller 56. The controller 56 may further be connected to codec circuitry 54 suitable for carrying out coding and decoding of image, video and/or audio data or assisting in coding and decoding carried out by the controller.

The apparatus 50 may further comprise a card reader 48 and a smart card 46, for example a UICC (Universal Integrated Circuit Card) and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The 30 apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The various embodiments may provide advantages. For example, bitrate can be greatly reduced, which is particularly beneficial in any multicamera handheld device, e.g. a pocket stereo camera or mobile phone comprising a stereo camera.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
    determining, by a processor, movement of a multicamera device between a first time and a second time, the multicamera device comprising at least a first camera and a second camera, wherein the movement represents a change with a distance and direction that is the same as the distance and direction between the first camera and the second camera at the first time;
    selecting a frame from the first camera at the first time; and
    entering the selected frame to a reference frame list of a frame from the second camera at the second time to be used for encoding of the frame from the second camera at the second time;
    wherein position and direction of the first camera at the first time are the same as position and direction of the second camera at the second time, and wherein the first camera and the second camera are different.

2. The method according to claim 1, further comprising determining a position and direction of a camera based on an accelerometer or a gyroscope of the camera.

3. The method according to claim 1, wherein the multi-camera comprises a stereo camera.

4. The method according to claim 1, further comprising determining a current relative distance and relation of the first camera and the second camera at the second time with respect to the first time.

5. The method according to the claim 4, further comprising comparing physical distance and relation of the first camera and the second camera with the current relative distance and relation of the first camera and the second camera between the second time and the first time.

6. The method according to claim 1, wherein an order and a location of the reference frame from the first camera in the reference frame list of the frame from the second camera depends on at least one of the following:
    an amount of movement in a scene between the second time and the first time; or
    a time difference between the second time and the first time.

7. An apparatus comprising at least one processor, and memory including computer program code, the memory and the computer program code configured to, with the at least one processor, cause the apparatus to perform at least the following:
    determine movement of a multicamera device between a first time and a second time, the multicamera device comprising at least a first camera and a second camera, wherein the movement represents a change with a distance and direction that is the same as the distance and direction between the first camera and the second camera at the first time;
    select a frame from the first camera at the first time; and
    enter the selected frame to a reference frame list of a frame from the second camera at the second time to be used for encoding of the frame from the second camera at the second time;
    wherein position and direction of the first camera at the first time are the same as position and direction of the second camera at the second time, and wherein the first camera and the second camera are different.

8. The apparatus according to claim 7, further comprising computer program code configured to cause the apparatus to determine a position and direction of a camera based on an accelerometer or a gyroscope of the camera.

9. The apparatus according to claim 7, wherein the multicamera device comprises a stereo camera.

10. The apparatus according to claim 7, further comprising computer program code configured to cause the apparatus to determine a current relative distance and relation of the first camera and the second camera at the second time with respect to the first time.

11. The apparatus according to the claim 10, further comprising computer program code configured to cause the apparatus to compare physical distance and relation of the first camera and the second camera with the current relative distance and relation of the first camera and the second camera between the second time and the first time.

12. The apparatus according to claim 7, wherein an order and a location of the reference frame from the first camera in the reference frame list of the frame from the second camera depends on at least one of the following:
- an amount of movement in a scene between the second time and the first time; or
- a time difference between the second time and the first time.

13. A computer program product embodied on a non-transitory computer readable medium, comprising computer program code configured to, when executed on at least one processor, cause an apparatus or a system to:
- determine movement of a multicamera device between a first time and a second time, the multicamera device comprising at least a first camera and a second camera, wherein the movement represents a change with a distance and direction that is the same as the distance and direction between the first camera and the second camera at the first time;
- select a frame from the first camera at the first time; and
- enter the selected frame to a reference frame list of a frame from the second camera at the second time to be used for encoding of the frame from the second camera at the second time;
- wherein position and direction of the first camera at the first time are the same as position and direction of the second camera at the second time, and wherein the first camera and the second camera are different.

14. The computer program product according to claim 13, further comprising computer program code configured to cause the apparatus or the system to determine a position and direction of a camera based on an accelerometer or a gyroscope of the camera.

15. The computer program product according to claim 13, wherein the multicamera device comprises a stereo camera.

16. The computer program product according to claim 13, further comprising computer program code configured to cause the apparatus to determine a current relative distance and relation of the first camera and the second camera at the second time with respect to the first time.

17. The apparatus according to the claim 13, further comprising computer program code configured to cause the apparatus to compare physical distance and relation of the first camera and the second camera with the current relative distance and relation of the first camera and the second camera between the second time and the first time.

18. The computer program product according to claim 13, wherein an order and a location of the reference frame from the first camera in the reference frame list of the frame from the second camera depends on at least one of the following:
- an amount of movement in a scene between the second time and the first time; or
- a time difference between the second time and the first time.

* * * * *